(12) United States Patent
Janness

(10) Patent No.: US 7,052,214 B2
(45) Date of Patent: May 30, 2006

(54) CUTTING INSERT AND TOOL HOLDER

(76) Inventor: Daniel L. Janness, 6947 Vernmoor, Troy, MI (US) 48098

( * ) Notice: Subject to any disclaimer, the term of this patent is extended or adjusted under 35 U.S.C. 154(b) by 410 days.

(21) Appl. No.: 10/188,933

(22) Filed: Jul. 2, 2002

(65) Prior Publication Data

US 2004/0005199 A1    Jan. 8, 2004

(51) Int. Cl.
*B23P 15/28*    (2006.01)
(52) U.S. Cl. ............................. 407/35; 407/42; 407/99
(58) Field of Classification Search ................ 407/35, 407/40, 42, 99, 102; 408/713, 231, 233
See application file for complete search history.

(56) References Cited

U.S. PATENT DOCUMENTS

| | | | |
|---|---|---|---|
| 3,546,759 A | 12/1970 | Sirola | 29/98 |
| 3,781,956 A * | 1/1974 | Jones et al. | 407/113 |
| 4,175,896 A | 11/1979 | Kishinami et al. | 408/230 |
| 4,334,446 A * | 6/1982 | Field | 82/158 |
| 4,693,641 A | 9/1987 | Tsujimura et al. | 407/42 |
| 4,834,591 A | 5/1989 | Tsujimura et al. | 407/113 |
| 4,919,573 A | 4/1990 | Tsujimura et al. | 407/40 |
| 5,064,316 A * | 11/1991 | Stojanovski | 407/40 |
| 5,123,787 A | 6/1992 | Hunt | 407/39 |
| 5,221,162 A | 6/1993 | Okawa | 407/40 |
| 5,536,119 A | 7/1996 | Werner et al. | 407/36 |
| 5,692,860 A | 12/1997 | Kramer | 407/34 |
| 5,904,448 A | 5/1999 | Lee et al. | 407/42 |
| 5,913,643 A | 6/1999 | Fowler et al. | 407/36 |
| 5,971,671 A * | 10/1999 | Mina | 407/42 |
| 6,071,045 A | 6/2000 | Janness | 407/42 |
| 6,158,927 A | 12/2000 | Cole et al. | 407/48 |

* cited by examiner

*Primary Examiner*—Willmon Fridie, Jr.
(74) *Attorney, Agent, or Firm*—Howard & Howard

(57) ABSTRACT

A diagonal ledge (22) is machined into each of the sidewalls (20) of the holder (12) with the ledges (22) crossing one another at an intersection B and the holder (12) is characterized by the bottom (18) of the pocket separating the ledges (22) to define a space between the ledges (22). A cutting insert (24) is characterized by a raised portion (32) on each face (26) thereof to present a pair of parallel and spaced shoulders (34) on each face (26) with the shoulders (34) on the first face (26) crossing the shoulders (34) on the second face (26). The assembly (10) is characterized by the shoulder (34) on the first face (26) seated on one of the ledges (22) and the shoulder (34) on the second face (26) seated on the other of the ledges (22) with a pair (28, 30) of cutting edges exposed for cutting. When worn, the insert (24) may be flipped one hundred and eighty degrees for exposing the other pair of cutting edges (28, 30).

40 Claims, 4 Drawing Sheets

CUTTING INSERT AND TOOL HOLDER

BACKGROUND OF THE INVENTION

1. Field of the Invention

The subject invention relates to a cutting insert and holder assembly of the type used in machining processes to cut metal.

2. Description of the Prior Art

Numerous cutting inserts are known in the prior art for cutting or milling operations. Concerns to be addressed in any cutting insert design are the dissipation of heat and the displacement of the cutting edges from the central plane of the cutting insert. In addition, it is most efficient to employ an indexable cutting insert that has multiple cutting positions whereby the cutting insert can be indexed from a first cutting position to a second cutting position to expose additional cutting edges when the cutting edges used in the first cutting position are worn.

The greater the mass of the cutting insert, the greater its capacity to dissipate heat generated during the cutting process. The closer the cutting edges are to the central plane of the cutting insert, the more efficient the cutting and the greater noise reduction. However, the closer the cutting edges are to the central plane, the less the mass of the cutting insert.

SUMMARY OF THE INVENTION AND ADVANTAGES

The invention provides a cutting insert and holder assembly comprising an elongated tool holder having a longitudinal axis and a first end having a pocket on the axis and a second end for support in a machine and a cutting insert having first and second oppositely disposed faces surrounded by a plurality of cutting edges. The pocket is on the longitudinal axis with a bottom and opposing and spaced sidewalls with a diagonal ledge in each of the sidewalls, the ledges crossing one another at an intersection as viewed perpendicularly to the sidewalls.

The holder is characterized by the bottom of the pocket separating the ledges to define a space between the ledges to separate the crossing ledges.

The insert is characterized by a raised portion on each face thereof to present a shoulder on each face with the shoulder on the first face crossing the shoulder on the second face as viewed perpendicularly to the faces.

The assembly is characterized by the shoulder on the first face being seated on one of the ledges and the shoulder on the second face seated on the other of the ledges with at least a first of the cutting edges of the insert being disposed above the pocket for cutting.

The invention also provides a method of making a cutting insert comprising the steps of finishing a hole in a near net shape insert having first and second oppositely disposed and spaced faces surrounded by four edges and machining a shoulder on each face relative to the hole with the shoulder on the first face crossing the shoulder on the second face as viewed perpendicularly to the faces.

The cutting insert of the subject invention minimizes the distance between the cutting edges and the central plane of the insert to reduce wear by improving the cutting efficiency and to reduce noise while at the same time increasing the mass of the cutting insert to improve heat dissipation.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Referring to the Figures, wherein like numerals indicate like or corresponding parts throughout the several views, a cutting insert and holder assembly is generally shown at (10).

Figure 2:
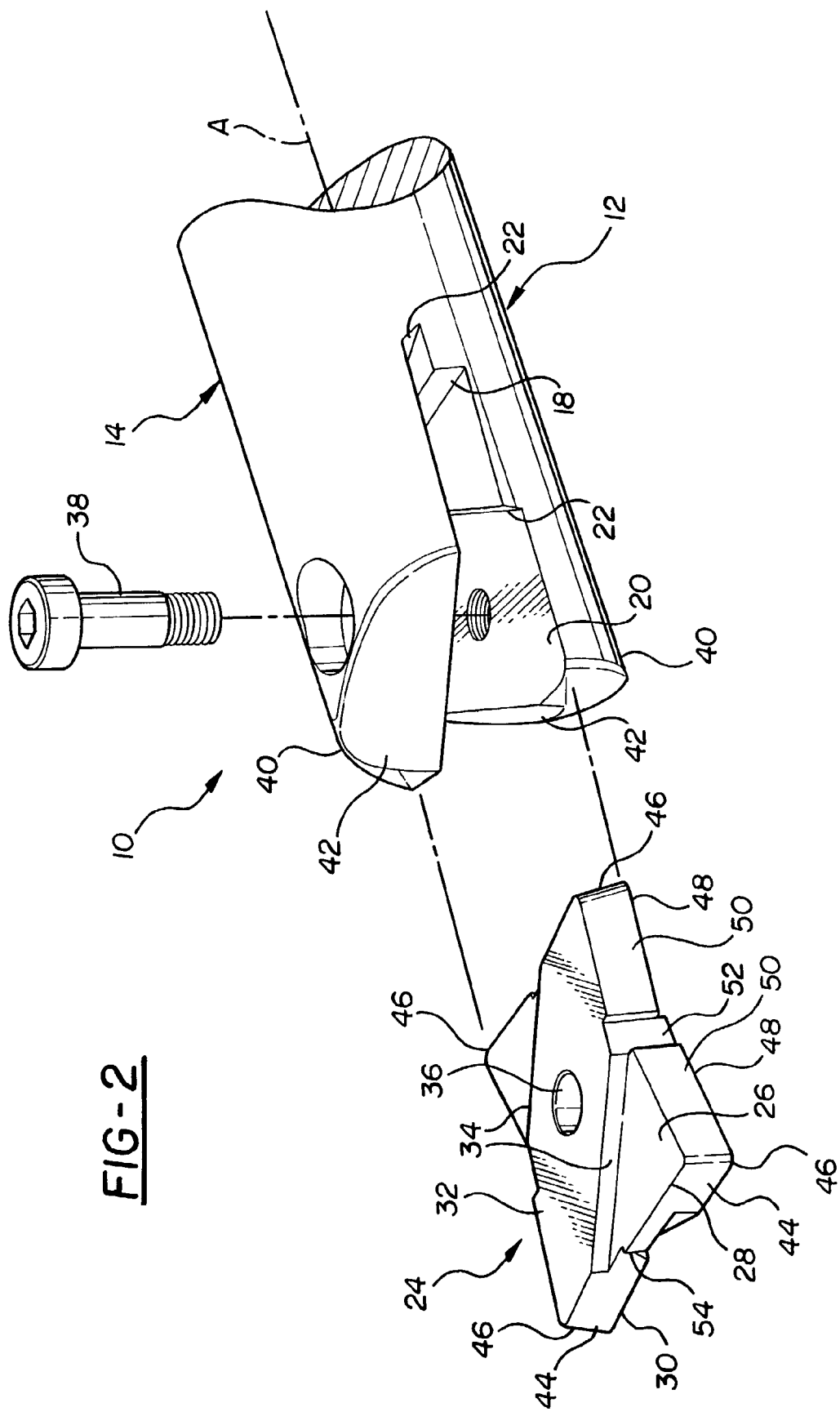
FIG. 2 is an enlarged and exploded perspective view of the assembly of FIG. 1.

The assembly includes an elongated tool holder, generally shown and indicated at (12). The tool holder (12) has a longitudinal or center axis (A) (FIG. 2) and a first end, generally indicated at (14), and a second end, generally indicated at (16), for support in a machine. A pocket is disposed on the axis (A) and is defined by a bottom (18) and opposing and spaced sidewalls (20). A diagonal ledge (22) is machined into each of the sidewalls (20) with the ledges (22) crossing, i.e., extending across, one another at an intersection on the longitudinal center axis (A) as viewed perpendicularly to the sidewalls (20). The holder (12) is characterized by the bottom (18) of the pocket separating the ledges (22) to define a space between the ledges (22) to separate the crossing ledges (22) from one another.

A cutting insert, generally shown at (24), is disposed in the pocket and has first and second oppositely disposed faces (26). The faces (26) are spaced apart by the thickness of the insert (24) surrounded by a plurality of cutting edges (28, 30) disposed in first and second pairs. The insert (24) is characterized by a raised portion (32) on each face (26) thereof to present a pair of parallel and spaced shoulders (34) on each face (26) with the shoulders (34) on the first face (26) crossing, i.e., extending across, the shoulders (34) on the second face (26), as viewed perpendicularly to the faces (26). The insert (24) may have one shoulder (34) on each face (26) with the shoulder (34) on the first face (26) crossing the shoulder (34) on the second face (26), as viewed perpendicularly to the faces (26).

The assembly (10) is characterized by the shoulder (34) on the first face (26) seated on one of the ledges (22) and the shoulder (34) on the second face (26) seated on the other of the ledges (22) with a pair (28, 30) of the cutting edges of the insert (24) disposed above the pocket for cutting. At a minimum, at least a first (28) of the cutting edges is disposed above the pocket.

The insert (24) includes a hole (36) extending between the faces (26) and a fastener (38) extends through the hole (36) while threadedly engaging the holder (12) for securing the insert (24) in the pocket. The hole (36) in the insert (24) is offset from the axis (A) of the fastener (38) when in engagement with the holder (12) for forcing the shoulders

(34) of the insert (24) into engagement with the ledges (22) of the holder (12). When the insert is fastened in the holder (12), a first of the shoulders (34) on each face (26) is seated on the adjacent ledge (22) with a first pair of the cutting edges (28, 30) of the insert (24) disposed above the pocket for cutting and a second pair of the cutting edges (28, 30) of the insert (24) disposed between and below the intersection B of the ledges (22). A first pair of the cutting edges (28, 30) of the insert (24) is disposed above the hole (36) for cutting and a second pair of the cutting edges (28, 30) of the insert (24) is disposed below the hole (36). The bottom (18) of the pocket extends below and separates the ledges (22) so that the bottom (18) separates and extends directly below the intersection B of the crossing ledges (22). For clearance, the second pair of cutting edges (28, 30) is spaced above the bottom (18).

The ledges (22) extend completely through the body of the holder (12) whereby each ledge (22) terminates at an upper end in the intersection thereof with the exterior of the holder (12) and terminates at a lower end in the intersection thereof with the exterior of the holder (12). The lower ends of the ledges (22) are disposed below the bottom (18).

Figure 1:
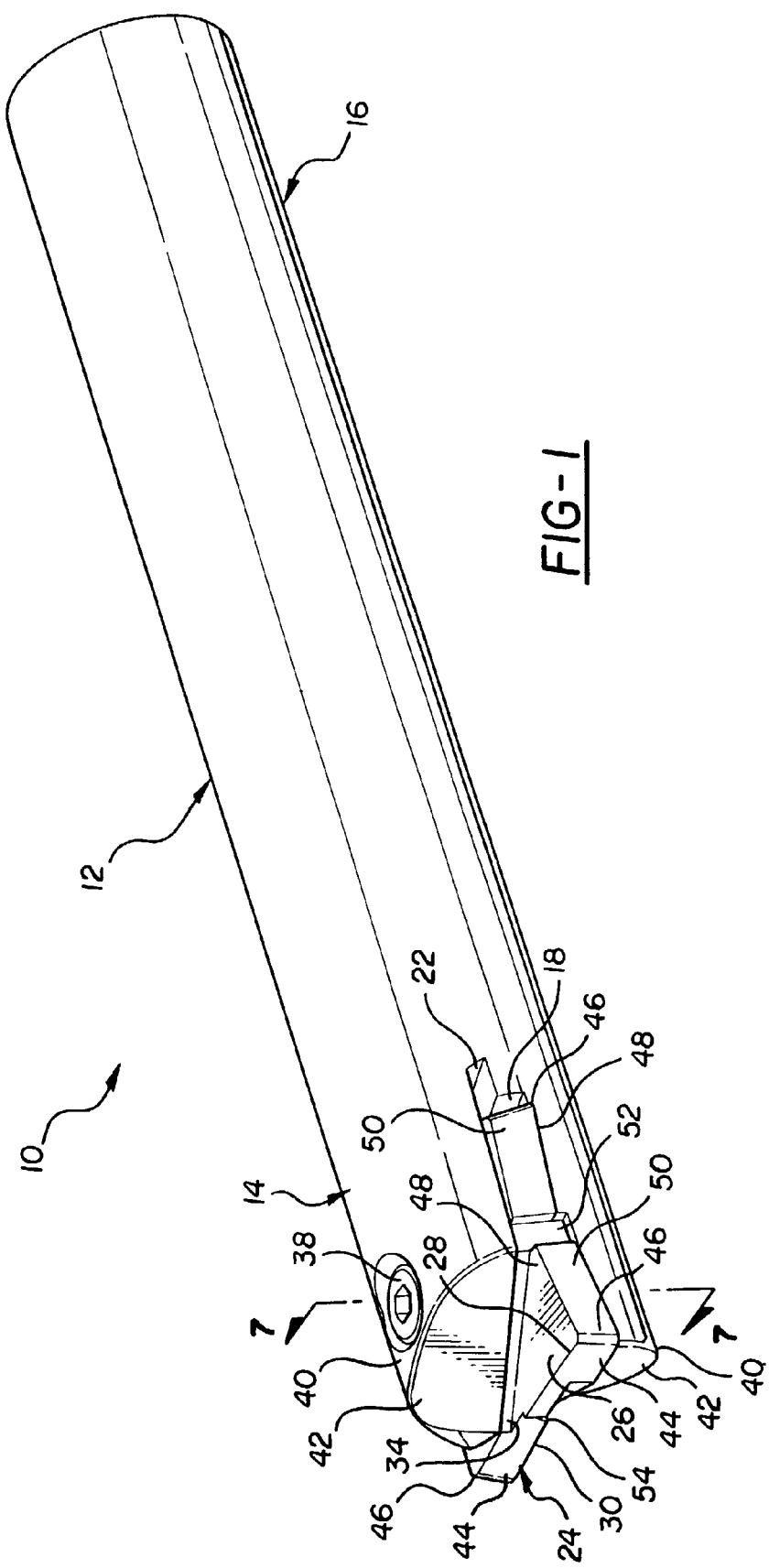
FIG. 1 is a perspective view of the cutting insert and holder assembly incorporating the subject invention.
Figures 3, 4:
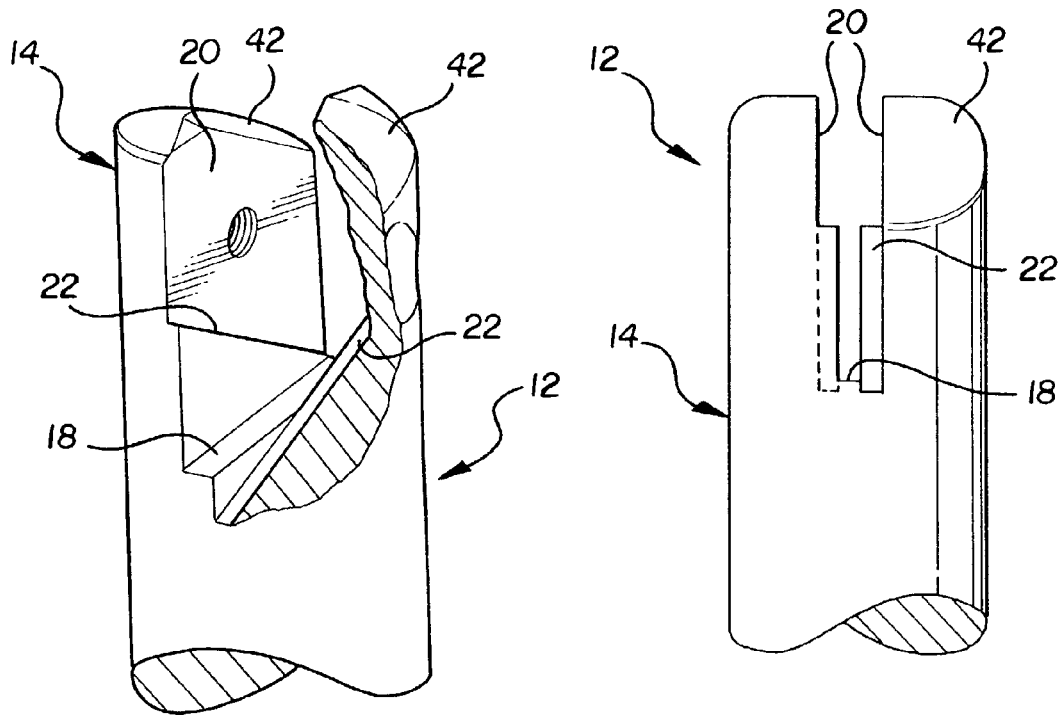
FIG. 3 is an enlarged perspective view partially broken away and in cross section of the holder of the subject invention.
FIG. 4 is a side view of the holder.
Figure 5:
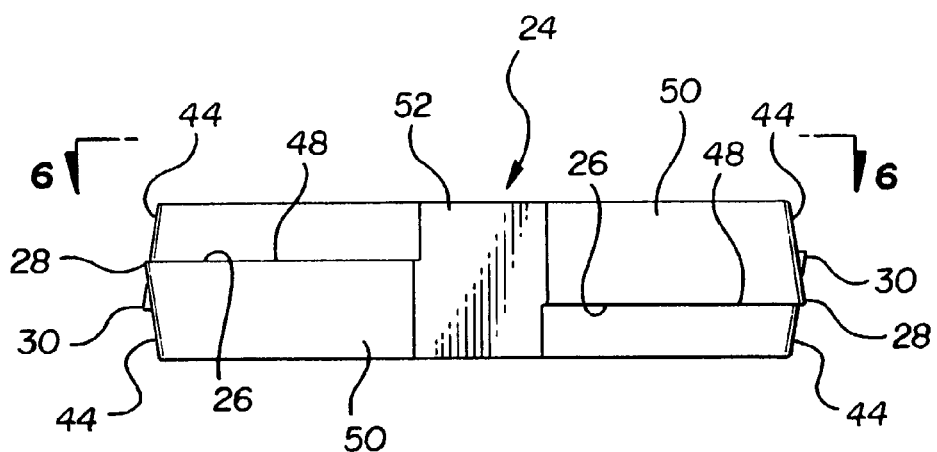
FIG. 5 is a side view of the cutting insert of the subject invention.

The first end (14) of the holder (12) is bifurcated by the pocket to define a pinnacle or finger (40) on each side of the pocket. The fastener (38) extends between the pinnacles (40) for securing the insert (24) in the pocket. Each of the pinnacles (40) has a top surface (42) slanted downwardly from one side of the longitudinal axis (A) to the other with the top surface (42) of one pinnacle (40) crossing i.e., extending across the top surface (42) of the other as viewed perpendicular to the sidewalls (20). As best illustrated in FIG. 1, a second of the shoulders (34) on each face (26) extends parallel to the top surface (42) of the pinnacle (40) adjacent thereto. Since the shoulders (34) on each face of the insert are parallel to one another and the lower shoulder (34) on each face engages the adjacent ledge (22), the slanted top surface (42) of each pinnacle (40) is parallel to the ledge (22) defined by that pinnacle (40) as best shown in FIGS. 3 and 4. Accordingly, each cutting edge (28, 30) is disposed above one of the shoulders (34) whereby one of the first pair of the cutting edges (28, 30) of the insert (24) is paired with and disposed above each of the second shoulders (34).

Figure 6:
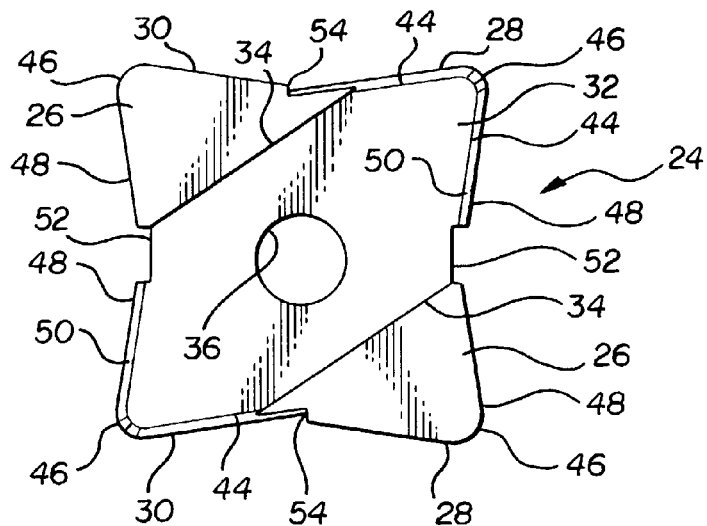
FIG. 6 is a face view taken along line 6—6 of FIG. 5.
Figure 7:
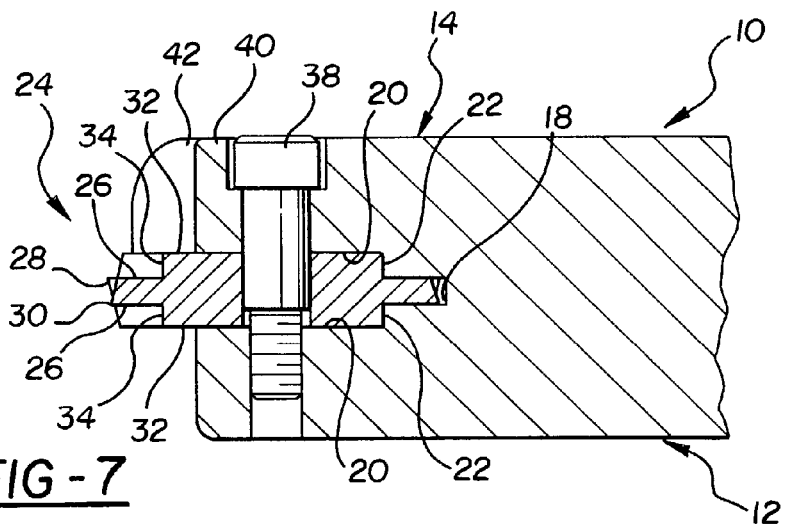
FIG. 7 is a cross sectional view taken along line 7—7 of FIG. 1.
Figure 8:
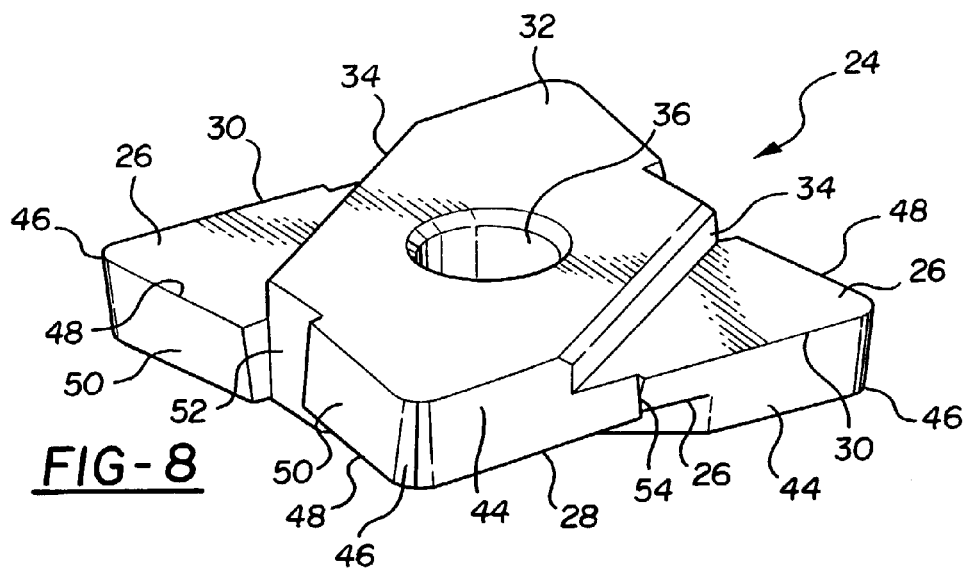
FIG. 8 is an enlarged perspective view of the cutting insert.

The insert (24) includes a relief (44) extending downwardly and away from each of the cutting edges (28, 30) and into the opposite raised portion (32). The insert (24) includes four corners (46) and each of the cutting edges (28, 30) extends around each corner and into an auxiliary side cutting edge (48). The insert (24) includes a side relief (50) inclined into the raised portion (32) from each auxiliary cutting edge (48). To facilitate the machining of the side reliefs (50), a notch (52) is first machined into the insert (24) between adjacent side reliefs (50). Each of the notches (52) is disposed between two of the auxiliary cutting edges (48) and a pair of the auxiliary cutting edges (48) extend upwardly and in opposite directions from each notch (52). As best viewed in FIGS. 1, 2, 6 and 8, one side of each notch (52) is generally or substantially aligned with one of the shoulders (34). Accordingly, the side reliefs (50) can be machined to the notch (52) where there is free space without precise intersection with the adjacent side relief (50), as is the case with the meeting of the main reliefs (44) at a crossing face (54). The cutting edges (28, 30) of each pair meet, and the first cutting edge (28) of each pair terminates above the relief (44) for the second cutting edge (30) of the pair and the second cutting edge (30) terminates above the relief (44) for the first cutting edge (28) of the pair. As is most clearly shown in FIG. 6, the first and second cutting edges (28, 30) of each pair slope downwardly toward one another from each corner (46) to the crossing face (54), which requires more precise machining in finishing the insert (24).

As will be appreciated by those skilled in the art, the insert (24) may be flipped one hundred and eighty degrees for exposing the other pair of cutting edges (28, 30) after the first exposed pair are worn.

The invention also includes a method of making the cutting insert (24). The method begins with a near net shape insert body that is about sixty thousandths larger than the finished cutting insert (24). All tolerances are in relation to the hole (36). In order to do that, the hole (36) must first be finished to close tolerances in the near net shape insert (24) having the first and second oppositely disposed and spaced faces (26) surrounded by four edges. Early in the method, the step is performed of machining the notch (52) between adjacent side reliefs (50), i.e., before machining the cutting edges (28, 30) whereby the side reliefs (50) may be machined up to the notches (52).

The method includes machining a shoulder (34) on each face (26) relative to the hole (36) with the shoulder (34) on the first face (26) crossing the shoulder (34) on the second face (26), as viewed perpendicularly to the faces (26). More specifically, the machining of the shoulder (34) is further defined as machining a pair of parallel and spaced shoulders (34) to define a raised portion (32) between the shoulders (34) on each face (26) of the insert (24) with the shoulders (34) on the first face (26) crossing the shoulders (34) on the second face (26), as viewed perpendicularly to the faces (26).

A first pair of cutting edges (28, 30) are machined in relationship to and above the hole (36) for cutting and a second pair of the cutting edges (28, 30) are machined in relationship to and below the hole (36). Each of the cutting edges (28, 30) is machined above one the shoulders (34). Each of the cutting edges (28, 30) is machined around one of four corners (46) and into an auxiliary side cutting edge (48).

The method includes machining a relief (44) extending downwardly and away from each of the cutting edges (28, 30) and into the opposite raised portion (32) and machining a side relief (50) inclined into the raised portion (32) from each auxiliary cutting edge (48).

The cutting edges (28, 30) of each pair are machined to meet at the crossing face (54) with the first cutting edge (28) of each pair terminating above the relief (44) for the second cutting edge of the pair and the second cutting edge (30) terminating above the relief (44) for the first cutting edge of the pair. Instead of having this precise machining at a juncture of the side reliefs (50), the notch (52) in formed with one side of each notch (52) in substantial alignment with one of the shoulders (34).

The first and second cutting edges (28, 30) of each pair are machined to slope inwardly toward one another from each corner (46) to the crossing face (54). And a pair of the auxiliary cutting edges (28, 30) are machined to extend upwardly and in opposite directions from each notch (52) to adjacent corners (46).

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the incentive novelty exercises its utility. In addition, the reference numerals in the claims are merely for convenience and are not to be read in any way as limiting.

What is claimed is:

1. A cutting insert (24) and holder (12) assembly comprising;

an elongated tool holder (12) having a longitudinal axis A and a first end (14) having a pocket on said axis A and a second end (16) for support in a machine, said pocket being on said axis A with a bottom (18) and opposing and spaced sidewalls (20) with a diagonal ledge (22) in each of said sidewalls (20), said ledges (22) crossing one another at an intersection B as viewed perpendicularly to said sidewalls (20), a cutting insert (24) disposed in said pocket and having first and second oppositely disposed faces (26) surrounded by a plurality of cutting edges (28, 30), said holder (12) characterized by said bottom (18) of said pocket separating said ledges (22) to define a space between said ledges (22) to separate said crossing ledges (22), and said insert (24) characterized by a raised portion (32) on each face (26) thereof to present a shoulder (34) on each face (26) with said shoulder (34) on said first face (26) crossing said shoulder (34) on said second face (26) as viewed perpendicularly to said faces (26), said assembly characterized by said shoulder (34) on said first face (26) seated on one of said ledges (22) and said shoulder (34) on said second face (26) seated on the other of said ledges (22) with at least a first of said cutting edges (28, 30) of said insert (24) disposed above said pocket for cutting.

2. An assembly as set forth in claim 1 wherein said insert (24) includes a hole (36) extending between said faces (26) and including a fastener (38) extending through said hole (36) and engaging said holder (12) for securing said insert (24) in said pocket.

3. An assembly as set forth in claim 2 wherein said hole (36) in said insert (24) is offset from the axis A of said fastener (38) when in engagement with said holder (12) for forcing said shoulders (34) of said insert (24) into engagement with said ledges (22) of said holder (12).

4. An assembly as set forth in claim 1 wherein said raised portion (32) on each face (26) of said insert (24) presents a pair of parallel and spaced shoulders (34) on each face (26) with said shoulders (34) on said first face (26) crossing shoulders (34) on said second face (26) as viewed perpendicularly to said faces (26).

5. An assembly as set forth in claim 4 wherein a first of said shoulders (34) on each face (26) is seated on the adjacent ledge (22) with a first pair of said cutting edges (28,30) of said insert (24) disposed above said pocket for cutting and a second pair of said cutting edges (28, 30) of said insert (24) disposed between and below said intersection B of said ledges (22).

6. An assembly as set forth in claim 5 wherein said bottom (18) of said pocket extends below and separates said ledges (22) so that said bottom (18) separates and extends directly below said intersection B of said crossing ledges (22).

7. An assembly as set forth in claim 6 wherein said second pair of cutting edges (28, 30) is disposed below said intersection B of said ledges (22).

8. An assembly as set forth in claim 7 wherein said second pair of cutting edges (28, 30) is spaced above said bottom (18).

9. An assembly as set forth in claim 8 wherein each of said ledges (22) terminates at an upper end in the intersection thereof with the exterior of said holder (12) and terminates at a lower end in the intersection thereof with the exterior of said holder (12), said lower ends of said ledges (22) being disposed below said bottom (18).

10. An assembly as set forth in claim 9 wherein said first end (14) of said holder (12) is bifurcated by said pocket to define a pinnacle (40) on each side of said pocket, each of said pinnacles (40) having a top surface (42) slanted downwardly from one side of said longitudinal axis A to the other with the top surface (42) of one pinnacle (40) crossing the top surface (42) of the other as viewed perpendicular to said sidewalls (20).

11. An assembly as set forth in claim 10 wherein a second of said shoulders (34) on each face (26) extends parallel to said top surface (42) of the pinnacle (40) adjacent thereto, one of said first pair of said cutting edges (28, 30) of said insert (24) being paired with and disposed above each of said second shoulders (34).

12. An assembly as set forth in claim 11 wherein said insert (24) includes a relief (44) extending downwardly and away from each of said cutting edges (28, 30) and into the opposite raised portion (32).

13. An assembly as set forth in claim 12 wherein said insert (24) includes four corners (46) and each of said cutting edges (28, 30) extends around each corner (46) and into an auxiliary side cutting edge (48).

14. An assembly as set forth in claim 13 wherein said insert (24) includes a side relief (50) inclined into said raised portion (32) from each auxiliary cutting edge (48).

15. An assembly as set forth in claim 14 wherein said insert (24) includes a notch (52) therein and disposed between adjacent side reliefs (50).

16. An assembly as set forth in claim 15 wherein said cutting edges (28), (30) of each pair meet with said first cutting edge (28) of each pair terminating above said relief (44) for the second cutting edge (30) of said pair and said second cutting edge (30) terminating above said relief (44) for the first cutting edge (28) of said pair.

17. An assembly as set forth in claim 16 wherein one side of each notch (52) is substantially aligned with one of said shoulders (34).

18. A cutting tool holder (12) comprising;

an elongated tool holder (12) having a central longitudinal axis (A) and a first end (14) having a pocket on said axis (A) and a second end (16) for support in a machine, said pocket being on and parallel to said axis (A) with a bottom (18) and opposing and spaced sidewalls (20) with a diagonal ledge (22) in each of said sidewalls (20), said ledges (22) extending across one another at an intersection on said center axis (A) as viewed perpendicularly to said sidewalls (20), said bottom (18) of said pocket separating said ledges (22) to define a space between said ledges (22) to separate said crossing ledges (22), said first end (14) of said holder (12) being bifurcated by said pocket to define a pinnacle (40) on each side of said pocket, each of said pinnacles (40) having a top surface (42) slanted downwardly from one side of said longitudinal axis (A) to the other, the slanted top surface (42) of one pinnacle (40) extending across the slanted top surface (42) of the other as viewed perpendicular to said sidewalls (20), said slanted top surface (42) of each pinnacle (40) being generally parallel to said ledge (22) defined by that pinnacle (40).

19. A holder (12) as set forth in claim 18 wherein said bottom (18) of said pocket extends below and separates said ledges (22) so that said bottom (18) separates and extends directly below said intersection of said crossing ledges (22).

20. A holder (12) as set forth in claim 19 wherein each of said ledges (22) terminates at an upper end in the intersection thereof with the exterior of said holder (12) and terminates at a lower end in the intersection thereof with the exterior of said holder (12), said lower ends of said ledges (22) being equally disposed along said longitudinal axis (A) and below said bottom (18).

21. A holder (12) as set forth in claim 18 including a fastener (38) extending between said pinnacles (40) and through said center axis (A) for securing an insert (24) in said pocket.

22. A cutting insert (24) comprising;
first and second oppositely facing faces (26) surrounded by four corners (46) and first and second pairs of cutting edges (28, 30) extending around said corners (46) and into an auxiliary side cutting edge (48),
a raised portion (32) on each face (26) thereof to present a pair of parallel and spaced shoulders (34) on each face (26) with said shoulders (34) on said first face (26) extending between and paired with said first pair of cutting edges (28, 30) and across said shoulders (34) extending between and paired with said second pair of cutting edges (28, 30) on said second face (26) as viewed perpendicularly to said faces (26).

23. A cutting insert (24) as set forth in claim 22 including a hole (36) extending between said faces (26) and a first pair of said cutting edges (28, 30) of said insert (24) is disposed above said hole (36) for cutting and a second pair of said cutting edges (28, 30) of said insert (24) is disposed below said hole (36).

24. A cutting insert (24) as set forth in claim 23 wherein one of said first pair of said cutting edges (28, 30) of said insert (24) is paired with and disposed above each of said second shoulders (34).

25. A cutting insert (24) as set forth in claim 24 including a relief (44) extending downwardly and away from each of said cutting edges (28, 30) and into the opposite raised portion (32).

26. A cutting insert (24) comprising;
first and second oppositely facing faces (26) surrounded by four corners (46) and a plurality of cutting edges (28, 30) extending around each corner (46) and into an auxiliary side cutting edge (48),
a raised portion (32) on each face (26) thereof to present a pair of parallel and spaced shoulders (34) on each face (26) with said shoulders (34) on said first face (26) extending across said shoulders (34) on said second face (26) as viewed perpendicularly to said faces (26), and
a side relief (50) inclined into said raised portion (32) from each auxiliary side cutting edge (48).

27. A cutting insert (24) as set forth in claim 26 including a notch (52) therein and disposed between adjacent side reliefs (50).

28. A cutting insert (24) as set forth in claim 25 wherein said cutting edges (28, 30) of each pair meet at a crossing face (54) with said first cutting edge (28) of each pair terminating above said relief (44) for the second cutting edge (30) of said pair and said second cutting edge (30) terminating above said relief (44) for the first cutting edge (28) of said pair.

29. A cutting insert (24) as set forth in claim 27 wherein one side of each notch (52) is substantially aligned with one of said shoulders (34).

30. A cutting insert (24) as set forth in claim 28 wherein said first and second cutting edges (28, 30) of each pair slope downwardly toward one another from each corner (46) to said crossing face (54).

31. A cutting insert (24) as set forth in claim 27 wherein each of said notches (52) is disposed between two of said auxiliary cutting edges (48) and a pair of said auxiliary cutting edges (48) extend upwardly and in opposite directions from each notch (52).

32. A method of making a cutting insert (24) comprising the steps of:
finishing a hole (36) in a near net shape insert (24) having first and second oppositely disposed and spaced faces (26) surrounded by four edges and four corners (46), and
machining a pair of parallel and spaced shoulders (34) to define a raised portion (32) between the shoulders (34) on each face (26) of the insert (24) with the shoulders (34) on the first face (26) extending between and paired with a first pair of corners and across the shoulders (34) extending between and paired with a second pair of corners on the second face (26) as viewed perpendicularly to the faces (26),
machining a pair of cutting edges (28, 30) around each of the four corners (46) and into an auxiliary side cutting edge (48).

33. A method as set forth in claim 32 further defined as machining each of the cutting edges (28, 30) above one the shoulders (34).

34. A method as set forth in claim 33 including machining a relief (44) extending downwardly and away from each of the cutting edges (28, 30) and into the opposite raised portion (32).

35. A method of making a cutting insert (24) comprising the steps of:
finishing a hole (36) in a near net share insert (24) having first and second oppositely disposed and spaced faces (26) surrounded by four edges and four corners (46), and
machining a pair of parallel and spaced shoulders (34) to define a raised portion (32) between the shoulders (34) on each face (26) of the insert (24) with the shoulders (34) on the first face (26) extending across the shoulders (34) on the second face (26) as viewed perpendicularly to the faces (26),
machining a first pair of cutting edges (28, 30) above the hole (36) and around each of the four corners (46) and into an auxiliary side cutting edge (48),
machining each of the cutting edges (28, 30) above one the shoulders (34),
machining a relief (44) extending downwardly and away from each of the cutting edges (28, 30) and into the opposite raised portion (32), and
machining a side relief (50) inclined into the raised portion (32) from each auxiliary side cutting edge (48).

36. A method as set forth in claim 35 including machining a notch (52) between adjacent side reliefs (50) before machining the cutting edges (28, 30) and machining the side reliefs (50) up to the notches (52).

37. A method as set forth in claim 36 further defined as machining the cutting edges (28, 30) of each pair to meet at a crossing face (54) with the first cutting edge (28) of each pair terminating above the relief (44) for the second cutting edge (30) of the pair and the second cutting edge (30) terminating above the relief (44) for the first cutting edge (28) of the pair.

38. A method as set forth in claim 37 further defined as machining one side of each notch (52) in substantial alignment with one of the shoulders (34).

39. A method as set forth in claim 38 further defined as machining the first and second cutting edges (28, 30) of each pair to slope inwardly toward one another from each corner (46) to the crossing face (54).

40. A method as set forth in claim 39 further defined as machining a pair of the auxiliary cutting edges (48) to extend upwardly and in opposite directions from each notch (52) to adjacent corners (46).

* * * * *

UNITED STATES PATENT AND TRADEMARK OFFICE
CERTIFICATE OF CORRECTION

| | | |
|---|---|---|
| PATENT NO. | : 7,052,214 B2 | Page 1 of 1 |
| APPLICATION NO. | : 10/188933 | |
| DATED | : May 30, 2006 | |
| INVENTOR(S) | : Daniel L. Janness | |

It is certified that error appears in the above-identified patent and that said Letters Patent is hereby corrected as shown below:

Column 8, line 40, delete "share" and insert therein --shape--.

Signed and Sealed this

Fifth Day of December, 2006

JON W. DUDAS
*Director of the United States Patent and Trademark Office*